(12) United States Patent
Noma et al.

(10) Patent No.: US 9,823,516 B2
(45) Date of Patent: Nov. 21, 2017

(54) LIQUID CRYSTAL DISPLAY DEVICE AND METHOD FOR PRODUCING SAME

(75) Inventors: Takeshi Noma, Osaka (JP); Youhei Nakanishi, Osaka (JP); Masanobu Mizusaki, Osaka (JP)

(73) Assignee: MERCK PATENT GMBH, Darmstadt (DE)

(*) Notice: Subject to any disclaimer, the term of this patent is extended or adjusted under 35 U.S.C. 154(b) by 191 days.

(21) Appl. No.: 14/345,470

(22) PCT Filed: Sep. 7, 2012

(86) PCT No.: PCT/JP2012/072947
§ 371 (c)(1),
(2), (4) Date: Mar. 18, 2014

(87) PCT Pub. No.: WO2013/047161
PCT Pub. Date: Apr. 4, 2013

(65) Prior Publication Data
US 2014/0333879 A1    Nov. 13, 2014

(30) Foreign Application Priority Data

Sep. 27, 2011 (JP) ................................. 2011-211558

(51) Int. Cl.
G02F 1/1337       (2006.01)
C09K 19/12        (2006.01)
C09K 19/04        (2006.01)

(52) U.S. Cl.
CPC ........ *G02F 1/133788* (2013.01); *C09K 19/12* (2013.01); *G02F 1/133703* (2013.01);
(Continued)

(58) Field of Classification Search
CPC ............ C09K 19/12; C09K 2019/0448; G02F 1/133703; G02F 1/133711;
(Continued)

(56) References Cited

U.S. PATENT DOCUMENTS

2004/0188653 A1* 9/2004 Kataoka ................. C09K 19/14
                                                    252/299.01
2005/0264737 A1   12/2005 Kataoka et al.
(Continued)

FOREIGN PATENT DOCUMENTS

JP    2001004986 A  *  1/2001
JP    2005082679 A  *  3/2005
(Continued)

OTHER PUBLICATIONS

Official Communication issued in International Patent Application No. PCT/JP2012/072947, dated Nov. 13, 2012.
(Continued)

*Primary Examiner* — Sophie Hon
(74) *Attorney, Agent, or Firm* — Keating & Bennett, LLP

(57) ABSTRACT

The present invention provides a liquid crystal display device that is less likely to have display failures and has high reliability and excellent light resistance in aging. The present invention relates to a liquid crystal display device, including: a pair of substrates; a liquid crystal layer containing liquid crystal molecules and interposed between the pair of substrates; and an alignment control layer for perpendicularly aligning the liquid crystal molecules, the alignment control layer being formed by polymerizing a monofunctional monomer and a polyfunctional monomer in a liquid crystal composition containing the liquid crystal molecules, the monofunctional monomer, and the polyfunctional monomer, the polyfunctional monomer generating a radical by annealing and irradiation with light at not less than 340 nm, the monofunctional monomer having a biphenyl skeleton as a core and a polymerizable group bonded to the biphenyl skeleton directly or indirectly via a spacer.

9 Claims, 6 Drawing Sheets

Before irradiation

UV irradiation

After irradiation

(52) U.S. Cl.
CPC ............... *G02F 1/133719* (2013.01); *C09K 2019/0448* (2013.01); *C09K 2019/122* (2013.01); *G02F 1/133711* (2013.01); *G02F 2001/133742* (2013.01); *Y10T 428/1005* (2015.01)

(58) Field of Classification Search
CPC ......... G02F 1/133719; G02F 1/133788; G02F 1/137; G02F 2001/133742; G02F 2001/13712; G02F 2001/13775; Y10T 428/1005–428/1032
USPC .......................................................... 428/1.2
See application file for complete search history.

(56) References Cited

U.S. PATENT DOCUMENTS

2010/0053527 A1* 3/2010 Hsieh .................... C09K 19/12
349/124
2011/0267574 A1* 11/2011 Kawahira ......... G02F 1/133788
349/158
2012/0026442 A1* 2/2012 Nakanishi ............ C09K 19/322
349/123
2013/0128204 A1* 5/2013 Mizusaki .............. C08F 220/18
349/130

FOREIGN PATENT DOCUMENTS

| JP | 2005-338613 A | 12/2005 | | |
|---|---|---|---|---|
| JP | WO 2010079703 A1 | * | 7/2010 | ........ G02F 1/133711 |
| JP | 2010-191450 A | | 9/2010 | |
| JP | WO 2010116565 A1 | * | 10/2010 | ........... C09K 19/322 |

OTHER PUBLICATIONS

Nakanishi et al.; "Liquid Crystal Display Device"; U.S. Appl. No. 14/003,470, filed Sep. 6, 2013.

* cited by examiner

Before irradiation → UV irradiation → After irradiation

Before irradiation → UV irradiation → After irradiation

LIQUID CRYSTAL DISPLAY DEVICE AND METHOD FOR PRODUCING SAME

TECHNICAL FIELD

The present invention relates to a liquid crystal display device and a method for producing the same. More specifically, the present invention relates to a liquid crystal display device that may have no conventional alignment film and control the alignment of liquid crystal molecules using an alignment control layer formed by polymerization of monomers contained in a liquid crystal composition, and an appropriate method for producing the same.

BACKGROUND ART

Liquid crystal display devices are widely used for display equipment of TVs, PCs, PDAs, and the like as they advantageously have a thin profile, light weight, and low power consumption. Especially, the size of liquid crystal display devices has rapidly increased in recent years, as typically shown in the case of liquid crystal display devices for TVs. For producing larger liquid crystal display devices, the MVA (Multi-domain Vertical Alignment) mode is favorably employed in which a large-sized display device having a wide view angle can be produced at a high yield. In the MVA mode, since liquid crystal molecules are aligned perpendicularly to a substrate face when no voltage is applied to a liquid crystal layer, the contrast ratio is higher than that of the conventional TN (Twisted Nematic) mode.

In the MVA mode, an alignment film does not control the tilt direction of liquid crystal molecules. The tilt direction of liquid crystal molecules is determined by protrusions (ribs) formed of insulating materials and/or slits of electrodes. Accordingly, alignment treatment on an alignment film is not needed, avoiding generation of static electricity and dusts by rubbing or the like. In such a case, cleaning treatment is not needed after formation of the alignment film. In addition, the initial tilt of liquid crystal molecules is less varied, which is effective in simplification of the production process, improvement in the yield, and cost reduction.

In the MVA mode, however, the alignment film itself is needed though the alignment treatment is not needed. More preferably, the alignment film is not formed, in consideration of the influence on the alignment of liquid crystal molecules given by the nonuniformity in the film thickness and contamination of the alignment film, and an increase in the production steps for forming the alignment film and investment for facilities.

To solve the above problem, a technique having been developed recently is forming an alignment control layer by enclosing a liquid crystal composition containing liquid crystals and polymerizable components such as monomers and oligomers (hereinafter, abbreviated as monomers and the like) between substrates, and polymerizing the monomers and the like (see Patent Literatures 1 and 2). Such an alignment control layer allows control of the alignment of liquid crystal molecules without an alignment film. The technique of controlling the alignment of liquid crystal molecules using, not an alignment film, an alignment control layer is also referred to as the alignment filmless technique.

CITATION LIST

Patent Literature

Patent Literature 1: JP-A 2005-338613
Patent Literature 2: JP-A 2010-191450

SUMMARY OF INVENTION

Technical Problem

Studies by the present inventors however clarified the following problem. That is, even in the case where an alignment control layer is formed by injecting a liquid crystal composition containing liquid crystal molecules, monomers, a polymerization initiator and the like between a pair of substrates and then causing a polymerization reaction under specific conditions, the controllability of the alignment of liquid crystal molecules may be insufficient depending on used materials and employed conditions, resulting in unfavorable display. For example, V-T characteristics may have hysteresis to cause a defective alignment, resulting in generation of bright spots or blight lines during black display.

More specifically, in the case where only lauryl acrylate represented by Formula (3) is used as a monomer, for example, though vertical alignment (aligning liquid crystal molecules perpendicularly to a substrate) can be conducted, display failures such as defective alignment (bright lines) may be observed. The reason for this is presumably that, though conventional irradiation (e.g., irradiation using a fluorescent bulb such as black light at ambient temperatures) using lauryl acrylate perpendicularly aligns liquid crystal molecules to some extent, the absence of an alignment film as a base leads to a failure in achieving sufficient vertical alignment. In addition, use of volatile lauryl acrylate raises concern about facility contamination.

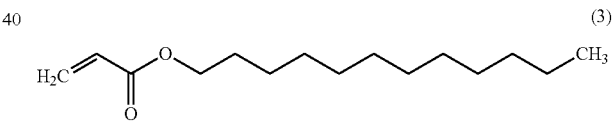

(3)

For another example, in the case where only 4-acryloyloxy-4'-octyloxybiphenyl represented by Formula (4) is used, the voltage holding rate (VHR) may be lowered even though the vertical alignment is achieved, lowering the reliability. When a monomer including biphenyl (core) and a polymerizable group directly bonded to the core is irradiated with UV light of short wavelength, cleavage is caused between the biphenyl and the polymerizable group. Being a monofunctional monomer to have no polymerizable group after the cleavage, the monomer is hardly polymerized and is likely to be ionized, not polymerized.

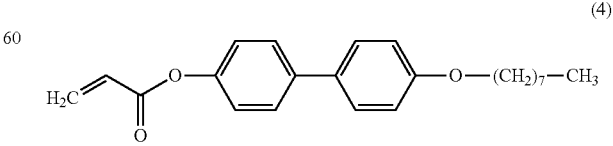

(4)

These monomers are all monofunctional monomers. Studies by the present inventors clarified that use of only a monofunctional monomer significantly lowers the VHR and that irradiation with UV light of short wavelength is needed to polymerize the monomer for achieving the vertical alignment.

In the technique disclosed in Patent Literature 1, a monofunctional monomer containing a benzene ring (core) and a polymerizable group directly bonded to the core and a polyfunctional monomer containing naphthalene or biphenyl as a core are irradiated with light at 310 nm or higher to be polymerized, thereby forming an alignment control layer. Accordingly, the vertical alignment is achieved without using an alignment film.

A monofunctional monomer containing phenyl (core) and a polymerizable group directly bonded to the core may have cleavage between phenyl and the polymerizable group when subjected to UV irradiation, significantly lowering the VHR. Moreover, a polyfunctional monomer containing naphthalene or biphenyl as a core needs to be irradiated with UV light of comparatively short wavelength (at most 310 nm) for polymerization. Such irradiation may deteriorate the liquid crystal composition, causing display failures.

In the technique disclosed in Patent Literature 2, a polyfunctional monomer having a steroid skeleton as a core is subjected to photoirradiation of 9000 mJ/cm$^2$ to be polymerized, thereby forming an alignment control layer. Accordingly, the vertical alignment is achieved without using an alignment film.

For polymerization of a polyfunctional monomer having a steroid skeleton as a core, however, the required energy of light is comparatively large to be about 9000 mJ/cm$^2$. Such irradiation may deteriorate the liquid crystal composition, possibly lowering the VHR. As a result, the reliability may be lowered. Patent Literature 2 does not mention about photoaging after irradiation. In the case of polymerization by photoirradiation of 9000 mJ/cm$^2$, the light resistance in aging is presumably low.

The present invention has been devised in consideration of the state of the art, and aims to provide a liquid crystal display device that is less likely to have display failures and has high reliability and excellent light resistance in aging, and a method for producing the same.

Solution to Problem

The present inventors have intensively studied about a liquid crystal display device that is less likely to have display failures and has high reliability and excellent light resistance in aging, to focus on the kind of monomers to be mixed in a liquid crystal composition. They found out that the problem in the conventional alignment filmless technique can be solved by a combination of a specific monofunctional monomer and a specific polyfunctional monomer. More specifically, the monofunctional monomer is a monomer having a biphenyl skeleton (core) and a polymerizable group bonded to the biphenyl skeleton directly or indirectly via a spacer. The polyfunctional monomer is a monomer that generates a radical by annealing and photoirradiation at not less than 340 nm. Use of these monomers enables to produce a liquid crystal display device that is less likely to have bright spots or bright lines, that is less likely to have a VHR lowered, and that has a higher VHR after aging than before aging. Accordingly, the present inventors solved the above problem, thereby completing the present invention.

Specifically, one aspect of the present invention provides a liquid crystal display device, including: a pair of substrates; a liquid crystal layer containing liquid crystal molecules and interposed between the pair of substrates; and an alignment control layer for perpendicularly aligning the liquid crystal molecules, the liquid crystal display device including substantially no alignment film, the alignment control layer being formed by polymerizing a monofunctional monomer and a polyfunctional monomer while a liquid crystal composition containing the liquid crystal molecules, the monofunctional monomer, and the polyfunctional monomer is interposed between the pair of substrates, the polyfunctional monomer generating a radical by annealing and irradiation with light at not less than 340 nm, the monofunctional monomer being represented by Formula (1) (hereinafter, also referred to as a "first liquid crystal display device of the present invention).

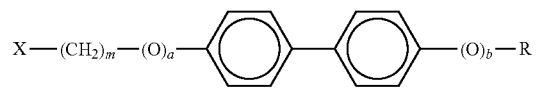

(1)

In Formula (1), X represents acrylate, methacrylate, ethacrylate, vinyl, or allyl, m represents an integer of 0 to 12, a and b each independently represent 0 or 1, R represents C1-C20 alkyl, and hydrogen atoms in a ring structure may each independently be substituted with halogen atom, methyl, ethyl, or propyl.

The first liquid crystal display device of the present invention is specifically described below.

The first liquid crystal display device of the present invention has substantially no alignment film. In a common liquid crystal display device, an alignment film is formed by directly applying (e.g., application of polyimide, polyamic acid, or the like) or by depositing (e.g., oblique deposition of silicon (Si)) materials of the alignment film onto a substrate face forming a display region. The display region is a region where images to be recognized by viewers are formed, and does not include a surrounding region such as terminal areas, for example. The alignment film is not limited to those subjected to the alignment treatment. Exemplary films subjected to the alignment treatment include those subjected to rubbing or photoalignment. In the case of forming alignment control structures such as MVA mode and PVA mode, the tilt of liquid crystal molecules can be controlled even without the alignment treatment. The phrase "having substantially no alignment film" as used herein refers to a case where such a conventional alignment film is not formed.

Since the pair of substrate are commonly attached (opposed) to each other, the phrase "having substantially no alignment film" also refers to formation of no alignment film on any of the pair of substrates before they attached (opposed) to each other.

An exemplary production process of the first liquid crystal display device of the present invention is described with reference to FIGS. 9 and 10. FIG. 9 is a flowchart illustrating an exemplary production process of a conventional liquid crystal display device. FIG. 10 is a flowchart illustrating an exemplary production process of a first liquid crystal display device of the present invention. The conventional liquid crystal display device illustrated in FIG. 9 has an alignment film, and the first liquid crystal display device of the present invention illustrated in FIG. 10 has substantially no alignment film. In the case of FIG. 9, the alignment film material is applied to each substrate after cleaning, the material is then fired at a high temperature of about 200° C., and the attaching step such as seal printing is carried out. After firing of the alignment film, the alignment film may be rubbed and cleaned. In the case of FIG. 10, after cleaning of substrates, the subsequent step is seal printing without forming an alignment film. The sealing material may be those cured by UV irradiation and/or heat. As mentioned above, in the production of the first liquid crystal display device of the present invention, an alignment film is not formed before attachment of the substrates. In the case of FIG. 9, after attachment of substrates subsequent to dropwise addition of a liquid crystal composition, a polarizer is attached. In the case of FIG. 10, after attachment of substrates subsequent to dropwise addition of a liquid crystal composition, a polymerization step for forming an alignment control layer, such as UV irradiation, is conducted. Instead of the dropwise addition, the injection method of the liquid crystal composition may also be vacuum injection. In that case, the liquid crystal composition is injected in vacuo after firing of the seal. The thickness of the liquid crystal layer may be maintained using a spacer. For example, columnar photospacers are patterned or spherical spacers are dispersed.

The substantial absence of an alignment film enables to omit complicated process of application of the alignment film material to a substrate and firing at high temperatures, allowing simplification of the production process, improvement in the yield, and cost reduction. For another problem, a current apparatus for forming an alignment film may become incapable of treating a mother glass that is enlarged more and more to satisfy the recent demand for large liquid crystal display devices. The first liquid crystal display device of the present invention in which an alignment control layer is formed is easily used for a large liquid crystal display device as it has substantially no alignment film.

The alignment control layer aligns the liquid crystal molecules perpendicularly. The present invention is suitably employed for liquid crystal display devices in which liquid crystal molecules are aligned perpendicularly, such as VA-mode liquid crystal display devices. Here, under the definition of "aligning perpendicularly", liquid crystal molecules are not necessarily aligned in a direction of 90° relative to the substrate face. The pre-tilt angle of liquid crystal layer is at least 85° and is preferably at least 88°.

Of the pair of substrates, at least one substrate commonly has an electrode to control application of the voltage to the liquid crystal layer. For example, one of the pair of substrates is an array substrate and the other is a color filter substrate. The array substrate has plural pixel electrodes that control the alignment of liquid crystals separately in each pixel. The color filter substrate has color filters of different colors each positioned to overlap with the pixel electrodes of the array substrate to control a displayed color in each pixel.

The liquid crystal layer contains liquid crystal molecules and is interposed between the pair of substrates. The properties of the liquid crystal layer and the liquid crystal molecules are not particularly limited and may be set as appropriate. The liquid crystal layer is preferably of the vertical alignment type. The liquid crystal layer and liquid crystal molecules preferably have negative dielectric anisotropy. This enables the production of a liquid crystal display device of the vertical alignment (VA) mode with a high contrast ratio. In a liquid crystal layer of the vertical alignment type, liquid crystal molecules are aligned in the direction substantially perpendicular to the substrate faces when the applied voltage is less than the threshold voltage, for example when no voltage is applied. In the case where a VA-type liquid crystal layer having negative dielectric anisotropy is used and application of the voltage to the liquid crystal layer is controlled by electrodes provided on each of the pair of substrates, application of the voltage of not lower than the threshold voltage generates electric flux lines in a direction substantially perpendicular to the substrate faces. As a result, liquid crystal molecules are aligned in the direction orthogonal to the electric flux lines, namely in the direction substantially parallel with the substrate faces.

The kind of the liquid crystal molecules is not particularly limited and may be selected as appropriate. In particular, nematic liquid crystal molecules are appropriate. Only one kind of or two or more kinds of liquid crystal molecules may be used.

The alignment control layer is a layer for controlling the alignment of the liquid crystal molecules. The alignment control layer is formed by polymerization of a monofunctional monomer and a polyfunctional monomer while a liquid crystal composition containing the liquid crystal molecules, the monofunctional monomer, and the polyfunctional monomer is interposed between the pair of substrates. Accordingly, the alignment control layer is mainly composed of polymers. The alignment control layer is commonly formed on each of the pair of substrates. In other words, the alignment control layer is commonly formed between the liquid crystal layer and each of the pair of substrates. Alternatively, the alignment control layer may form a network structure throughout the liquid crystal layer. The alignment control layer controls the alignment of, in particular, closely positioned liquid crystal molecules among liquid crystal molecules dispersed in the liquid crystal layer. Thus, the first liquid crystal display device of the present invention achieves the vertical alignment even without an alignment film. The concept of the alignment control layer as used herein is distinguished from that of the alignment film.

The polyfunctional monomer has at least two (preferably two) polymerizable groups, namely polymerizable functional groups, in a molecule and generates radicals by annealing and photoirradiation at not less than 340 nm.

Many high pressure mercury lamps commonly used as a light source emit light having a small blight line peak at 313 nm and a great emission intensity at not less than 330 nm. For enough photopolymerization of monomers having an absorption wavelength of less than 330 nm, UV irradiation using a high pressure mercury lamp needs to be performed for a long time for a plurality of times. However, UV irradiation for a long time may deteriorate components (e.g., liquid crystal layer) of the liquid crystal display device, causing defects such as image sticking.

UV Irradiation for a short time for avoiding progress of deterioration of the liquid crystal layer may lead to insufficient polymerization of monomers to form a defective alignment control layer. In such a case, defects such as image sticking may be caused. Accordingly, use of monomers that absorb light having a wavelength of not less than 330 nm increases the light use efficiency, allowing efficient formation of the alignment control layer even by single irradiation for a short time. The polyfunctional monomer subjected to annealing and photoirradiation at not less than 340 nm generates radicals to form an alignment control layer, which enables stable alignment of liquid crystal molecules to realize a high VHR.

The polyfunctional monomer presumably generates radicals mainly by photoirradiation at not less than 340 nm. Presumably, the polyfunctional monomer subjected to annealing (heat treatment), not to photoirradiation, can also generate radicals. Though the amount of generated radicals is considered to be smaller than that in the case of performing photoirradiation, constituents of the liquid crystal display device are still less likely to be deteriorated as it is possible to generate radicals without photoirradiation. In a case where the alignment of the monofunctional monomer is disturbed by the interaction between the monofunctional monomer and liquid crystal molecules, annealing can reduce the interaction. In other words, the polyfunctional monomer can generate radicals by annealing or photoirradiation at not less than 340 nm.

Here, the phrase "annealing and photoirradiation at not less than 340 nm" refers to a case where annealing and photoirradiation are simultaneously conducted and a case where, after annealing, the liquid crystal composition (liquid crystal cell) is irradiated with light at a temperature higher than the ambient temperature (preferably at least at a temperature that is 30° C. lower than Tni).

The first liquid crystal display device of the present invention has a higher VHR after aging than before aging. Such a feature also presumably owes to the use of the polyfunctional monomer. Improvement in the VHR after aging is presumably caused by aging that polymerize ionized monomers remaining in the liquid crystal in a gentle pace to further form polymers (alignment control layer). This reduces monomers remaining in the liquid crystal as impurities, thereby improving the VHR. Further formation of the alignment control layer enhances the function of the alignment control layer as an insulating layer to limit the charge transfer from transparent electrodes, thereby presumably improving the VHR. In addition, even if the monofunctional monomer itself does not absorb light having a wavelength of not less than 330 nm, the polyfunctional monomer generates radicals by photoirradiation at not less than 330 nm and the radicals attack polymerizable groups in the monofunctional monomer. Accordingly, the monofunctional monomer can be polymerized without photoirradiation at less than 330 nm.

The monofunctional monomer is represented by Formula (1) and has a single polymerizable group in a molecule. As mentioned above, use of only a common monofunctional monomer may lower the VHR or generate bright lines. Moreover, the monofunctional monomer represented by Formula (1) may have a polymerizable group directly bonded to the biphenyl skeleton (core). Combination use with the polyfunctional monomer enables maintenance of a high VHR even after polymerization. Combination use with the polyfunctional monomer presumably suppresses exposure of the monofunctional monomer to a severe environment (e.g. UV irradiation for a long time) in which cleavage may be caused between the core and the polymerizable group. The monofunctional monomer has a biphenyl skeleton that has strong interaction with liquid crystal molecules. Two benzene rings bonded to each other have bonded sites at the 1 and 1' positions and have a linear structure. Moreover, the linear structure is stable as a bent portion is not present between the functional group (polymerizable group) at the end and biphenyl. Accordingly, closely positioned liquid crystal molecules are aligned with a stable alignment force. In other words, the alignment control layer is provided with a strong alignment force. As a result, favorable alignment properties (preferably, vertical alignment properties) are provided, leading to the production of a liquid crystal display device having less bright spots or bright lines and favorable display quality. Since the monofunctional monomer is less volatile, volatilization thereof upon placement of the liquid crystal composition between the substrates can be suppressed even in vacuo. Accordingly, contamination of facilities can be avoided.

In the case where only a polyfunctional monomer is used to form an alignment control layer, the achieved alignment controllability may be insufficient. Therefore, preferred is combination use of a polyfunctional monomer and a monofunctional monomer having a linear molecular structure.

The monofunctional monomer preferably functions, after polymerization, as a portion exhibiting alignment controllability (vertical alignment properties) in the alignment control layer. In other words, the structure derived from the monofunctional monomer preferably controls the alignment of liquid crystal molecules in the alignment control layer. In contrast, the structure derived from the polyfunctional monomer may not control the alignment of liquid crystal molecules.

The monofunctional monomer has acrylate, methacrylate, ethacrylate, vinyl, or allyl. Any of these functional groups can function as a polymerizable group and generate radicals by photoirradiation. More specifically, photoirradiation may cause cleavage of the functional group to generate radicals. In addition, the polyfunctional monomer generates radicals by annealing and photoirradiation at not less than 340 nm. In other words, both the monofunctional monomer and the polyfunctional monomer can also function as polymerization initiators. Accordingly, the liquid crystal composition interposed between a pair of substrates initiates radical polymerization when supplied with energies such as heat and light, thereby forming an alignment control layer.

It is to be noted that other polymerization initiators may be used for the first liquid crystal display device of the present invention in addition to the polyfunctional monomer and the monofunctional monomer as described later.

At least one kind of the polyfunctional monomer, and at least one kind of the monofunctional monomer may be used. The number of the kind of each may be set as appropriate. The polyfunctional monomer and the monofunctional monomer can be prepared in the same manner as in the production of monomers used in conventional alignment filmless techniques.

The alignment control layer is formed by polymerization (copolymerization) of at least the polyfunctional monomer and the monofunctional monomer, and therefore the polymer contained in the alignment control layer is commonly considered to be a copolymer. In the case where the alignment control layer contains a copolymer, the alignment of the repeating unit of the copolymer is not particularly limited, and the copolymer may be any of the random, block, and alternate copolymers.

The average molecular weight of the polymers contained in the alignment control layer is not particularly limited, and may be similar to the number average molecular weight or weight average molecular weight of polymers formed by conventional alignment filmless techniques. Typically, the number of repeating units is preferably not less than 8, and the molecular weight is preferably not less than 1000.

The configuration of the first liquid crystal display device of the present invention is not especially limited as long as it essentially includes such components.

In the following, other preferable embodiments of the first liquid crystal display device of the present invention are described. Embodiments of the first liquid crystal display device of the present invention may be combined as appropriate.

The first liquid crystal display device of the present invention does not necessarily have a silane coupling layer between each of the pair of substrates and the alignment control layer. The silane coupling layer refers to a layer constituted by a component containing a silane coupling compound. The silane coupling compound refers to a compound containing silicon (Si) and an organic functional group (Y). Examples of the organic functional group (Y) include epoxy, methacryloxy, acryloxy, amino, ureide, chloropropyl, mercapto, and isocyanate.

For further promoting the polymerization reaction, "a" and "b" in Formula (1) each preferably represent 0. The reason for this is that the presence of oxygen atom damages the linearity of the molecular structure to lower the alignment force and that, since oxygen atom strongly attract electrons, the monofunctional monomer may be ionized. For easily synthesizing the monofunctional monomer, however, "a" and "b" in Formula (1) each preferably represent 1.

In Formula (1), "R" preferably represents C6-C18 alkyl. With the carbon number of 5 or less, liquid crystal molecules may not be aligned perpendicularly. With the carbon number of 19 or more, monomers may not be sufficiently dissolved in a liquid crystal composition.

In Formula (1), "m" preferably represents an integer of 1 to 12. If the monofunctional monomer in which a polymerizable group is directly bonded to the core is irradiated with UV light, cleavage may be caused between the core and the polymerizable group, possibly reducing the voltage holding ratio (VHR). Therefore, a spacer containing an alkyl chain is preferably, introduced between the core and the polymerizable group. Such a structure avoids cleavage between the core and the polymerizable group. In Formula (1), "m" represents an integer of more preferably 1 to 10, and still more preferably 1 to 8.

A specific structure of the polyfunctional monomer is not particularly limited as long as it can generate radicals by annealing and photoirradiation at not less than 340 nm and has at least two polymerizable groups. The polyfunctional monomer preferably has a structure in which at least three benzene rings are condensed (hereinafter, also referred to as a condensed ring structure), and more preferably has a condensed ring structure and at least two polymerizable groups each directly bonded to the condensed ring structure. The reason for this is that a condensed aromatic compound having at least three benzene rings efficiently absorbs long-wavelength light (at not less than 340 nm). The number of benzene rings in the condensed ring structure is preferably three. In the monofunctional monomer, a polymerizable group can be bonded to the ring structure via a spacer. In the polyfunctional monomer, however, if a polymerizable group is bonded to the ring structure via a spacer, the monomer may not sufficiently generate radicals upon photoirradiation, lowering the polymerization speed.

More specifically, the polyfunctional monomer is preferably represented by Formula (2).

In Formula (2), $P^1$s each independently represent acrylate, methacrylate, ethacrylate, vinyl, or allyl, and $A^1$ represents phenanthrylene. Hydrogen atoms in $A^1$ may each independently be substituted with halogen atom, methyl, ethyl, or propyl. A monomer having a phenanthrene skeleton is preferable as it absorbs long-wavelength light (at not less than 340 nm).

A bifunctional monomer having a phenanthrene skeleton absorbs light even at not less than 340 nm, and is hardly polymerized by long-wavelength light contained in the light emitted from the back light unit, sufficiently achieving the effect of improving the VHR given by aging.

Specific examples of the polyfunctional monomer represented by Formula (2) include monomers represented by Formulae (12-1) to (12-4) mentioned below.

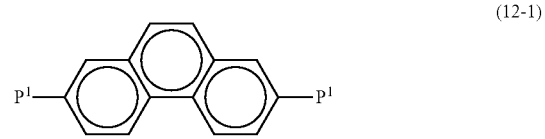

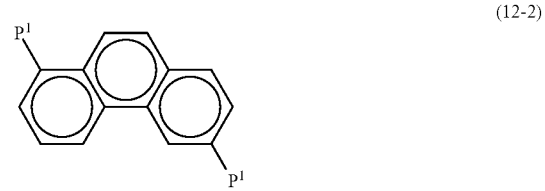

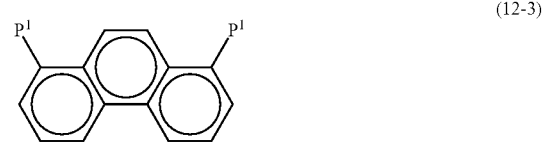

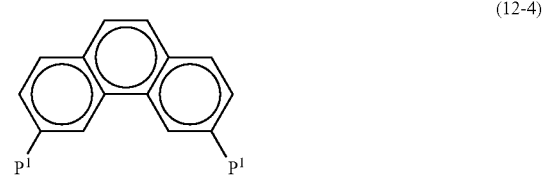

In Formulae (12-1) to (12-4), $P^1$s each independently represent acrylate, methacrylate, ethacrylate, vinyl, or allyl. Hydrogen atoms in the phenanthrene skeleton may each independently be substituted with halogen atom, methyl, ethyl, or propyl. As shown in Formulae (12-1) to (12-4), in the polyfunctional monomer represented by Formula (2), the position where $A^1$ and $P^1$ are bonded to each other is not particularly limited. From the standpoint of securing the linearity of monomers, it is preferably at the position shown in Formula (12-1).

The liquid crystal molecules preferably have negative dielectric anisotropy. In such a case, for example, use of a vertical-alignment liquid crystal layer provides one embodiment of the VA (Vertical Alignment) mode that provides excellent contrast.

In the liquid crystal composition, that is, in the liquid crystal composition before polymerization, the ratio of the polyfunctional monomer to the monofunctional monomer is preferably not less than 1.5 mol % but not more than 20 mol %. If the ratio of the polyfunctional monomer to the monofunctional monomer is less than 1.5 mol % or more than 20 mol %, favorable alignment performance (e.g., vertical alignment) may not be achieved. The ratio of the polyfunctional monomer to the monofunctional monomer is more preferably not less than 5 mol % but not more than 15 mol %.

The liquid crystal composition may further contain a compound that generates radicals by a self-cleavage reaction caused by photoirradiation. The alignment control layer may be formed by polymerization of the monofunctional monomer, the polyfunctional monomer, and the compound in the liquid crystal composition. The use of such a compound (polymerization initiator) enables to reduce the energy of light required for polymerization.

The compound preferably has at least one radical polymerizable group, and more preferably at least two radical polymerizable groups. The use of such a compound (polymerization initiator with a polymerizable group) allows polymerization of the compound itself, suppresses generation of impurities derived from the polymerization initiator, further avoids reduction in the voltage holding ratio (VHR) in the liquid crystal layer, and further reduces deterioration in the display quality. In addition, photoirradiation completed in a shorter time avoids deterioration of component members due to photoirradiation for a long time, enabling the production of a more reliable liquid crystal display device.

Examples of the radical polymerizable group include (meth)acryloyloxy, (meth)acryloyl amino, vinyl, and vinyloxy. Here, the (meth)acryloyloxy refers to acryloyloxy or methacryloyloxy, and the (meth)acryloylamino refers to acryloylamino or methacryloylamino.

The compound that generates radicals by a self-cleavage reaction caused by photoirradiation is preferably a compound that generates radicals by irradiation with a wavelength component of not less than 340 nm. The compound that generates radicals by a self-cleavage reaction caused by photoirradiation is preferably a compound that generates radicals by irradiation with a wavelength component of less than 400 nm. Irradiation with a wavelength component of less than 340 nm may deteriorate a structure inside a panel, damaging the performance as a display device. Accordingly, a self-cleaving photopolymerization initiator to which a polymerizable group is bonded preferably has a structure that efficiently causes a self-cleavage reaction by irradiation with a wavelength component of not less than 340 nm to generate radicals. In the common use, if a photopolymerization initiator absorbs light (specifically, light at not less than 400 nm) emitted from a back light unit (cold cathode fluorescent tube or LED) used for display, the photopolymerizatoin initiator that is layer-separated by polymerization without cleavage may react during operation of the display, possibly lowering long-term reliability. Accordingly, the compound preferably has a structure in which a polymerizable group is bonded to a photopolymerizable compound that does not or hardly absorb light at not less than 400 nm. This enables the production of a liquid crystal display device with high long-term reliability.

The compound may be a compound having a structure in which a polymerizable group is bonded to a self-cleaving photopolymerization initiator that generates radicals by a self-cleavage reaction caused by photoirradiation. Specific examples thereof include those having a structure that is formed by bonding a polymerizable group directly or bonding a functional group having a polymerizable group, to the molecular skeleton of a self-cleaving photopolymerization initiator, such as 2,2-dimethoxy-1,2-diphenylethan-1-one (product name: IRGACURE651), 1-hydroxy-cyclohexyl-phenyl-ketone (product name: IRGACURE184), 2-hydroxy-2-methyl-1-phenyl-propane-1-one (product name: IRGACURE1173), 1-[4-(2-hydroxyethoxy)-phenyl]-2-hydroxy-2-methyl-1-propane-1-one (product name: IRGACURE2959), 2-hydroxy-1-{4-[4-(2-hydroxy-2-methyl-propionyl)-benzyl]-phenyl}-2-methyl-propane-1-one (product name: IRGACURE127), phenylglyoxylic acid methylester (product name: DAROCURMBF), 2-methyl-1-[4-(methylthio)phenyl]-2-morpholinopropane-1-one (product name: IRGACURE907), 2-benzyl-2-dimethylamino-1-(4-morpholinophenyl)-butanone-1 (product name: IRGACURE369), 2-dimethylamino-2-(4-methyl-benzyl)-1-(4-morpholine-4-yl-phenyl)-butane-1-one (product name: IRGACURE379), bis(2,4,6-trimethylbenzoyl)-phenylphosphineoxide (product name: IRGACURE819), 2,4,6-trimethylbenzoyl-diphenyl-phosphineoxide (product name: DAROCURTPO), bis(η5-2,4-cyclopentadiene-1-yl)-bis(2,6-difluoro-3-(1H-pyrrole-1-yl)-phenyl)titanium (product name: IRGACURE784), 1,2-octanedione, 1-[4-(phenylthio)-, 2-(O-benzoyloxime)] (product name: IRGACURE-OXE01), ethanone, 1-[9-ethyl-6-(2-methylbenzoyl)-9H-carbazole-3-yl]-, 1-(O-acetyloxime) (product name: IRGACUREOXE02), and 2-ethylhexyl-4-dimethylaminobenzoate (product name: DAROCUREHA).

The compound is preferably a self-cleaving photopolymerization initiator having an absorption coefficient of not more than 20 ml/g·cm for a wavelength component of not less than 400 nm in consideration of driving conditions of a liquid crystal display device. Specific examples thereof include those having a structure that is formed by bonding a polymerizable group directly or bonding a functional group having a polymerizable group, to the molecular skeleton of 2,2-dimethoxy-1,2-diphenylethan-1-one (product name: IRGACURE651), 1-hydroxy-cyclohexyl-phenyl-ketone (product name: IRGACURE184), 2-hydroxy-2-methyl-1-phenyl-propane-1-one (product name: IRGACURE1173), 1-[4-(2-hydroxyethoxy)-phenyl]-2-hydroxy-2-methyl-1-propane-1-one (product name: IRGACURE2959), 2-hydroxy-1-{4-[4-(2-hydroxy-2-methyl-propionyl)-benzyl]-phenyl}-2-methyl-propane-1-one (product name: IRGACURE127), phenylglyoxylic acid methylester (product name: DAROCURMBF), 2-methyl-1-[4-(methylthio)phenyl]-2-morpholino propane-1-one (product name: IRGACURE907), ethanone, 1-[9-ethyl-6-(2-methylbenzoyl)-9H-carbozole-3-yl]-, 1-(O-acetyloxime) (product name: IRGACUREOXE02), or 2-ethylhexyl-4-dimethylaminobenzoate (product name: DAROCUREHA).

The compound is more preferably a compound represented by Formula (5).

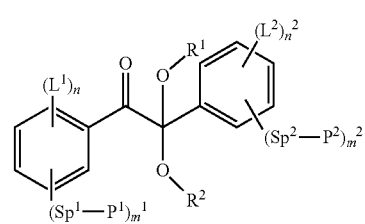

(5)

In Formula (5), $R^1$ represents C1-C4 linear or branched alkyl or alkenyl, or $Sp^3$-$P^3$. $R^2$ represents C1-C4 linear or branched alkyl or alkenyl, or $Sp^4$-$P^4$. $P^1$, $P^2$, $P^3$, and $P^4$ represent radical polymerizable groups that are the same as or different from one another and the total number is at least two. $Sp^1$ represents C1-C6 linear, branched, or cyclic alkylene, alkyleneoxy, or carbonyloxy, or a direct bond. In the case where $m^1$ is at least 2, $Sp^1$s may be the same as or different from each other. $Sp^2$ represents C1-C6 linear, branched, or cyclic alkylene, alkyleneoxy, or carbonyloxy, or a direct bond. In the case where $m^2$ is at least 2, $Sp^2$s may be the same as or different from each other. $Sp^3$ represents C1-C6 linear, branched, or cyclic alkylene, alkyleneoxy, or carbonyloxy. $Sp^4$ represents C1-C6 linear, branched, or cyclic alkylene, alkyleneoxy, or carbonyloxy. $L^1$ represents —F, —OH, or C1-C12 linear or branched alkyl, alkenyl, or aralkyl. In the case where $n^1$ is at least 2, $L^1$s may be the same as or different from each other. In the case where two $L^1$s are respectively bonded to two adjacent carbon atoms in an aromatic ring, they may be bonded to each other to form a cyclic structure. Alternatively, the two $L^1$s are the same as or different from each other and each form C1-C12 linear or branched alkylene or alkenylene. $L^2$ represents —F, —OH, or C1-C12 linear or branched alkyl, alkenyl, or aralkyl. In the case where $n^2$ is at least 2, $L^2$s may be the same as or different from each other. In the case where two $L^2$s are respectively bonded to two adjacent carbon atoms in an aromatic ring, they may be bonded to each other to form a cyclic structure. Alternatively, the two $L^2$s are the same as or different from each other and each form C1-C12 linear or branched alkylene or alkenylene. At least one hydrogen atom in the alkyl, alkenyl, alkylene, alkenylene, or aralkyl represented by $L^1$ and $L^2$ may be substituted with —F or —OH. A —CH$_2$— in the alkyl, alkenyl, alkylene, alkenylene, or aralkyl represented by $L^1$ and $L^2$ may be substituted with —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, —OCO—CH=CH—, Sp$^1$-P$^1$, or Sp$^2$-P$^2$, provided that oxygen, sulfur, and nitrogen atoms are not adjacent to one another. In Formula (5), $m^1$ represents an integer of 1 to 3, $m^2$ represents an integer of 0 to 3, $n^1$ represents an integer of 0 to 4, and $n^2$ represents an integer of 0 to 4. The total of $m^1$ and $n^1$ is an integer of 1 to 5. The total of $m^2$ and $n^2$ is an integer of 0 to 5. The total of $m^1$ and $m^2$ is an integer of 1 to 6.

Preferably, $P^1$, $P^2$, $P^3$, and $P^4$ are the same or different (meth)acryloyloxy.

Preferably, $R^1$ and $R^2$ are the same, and $P^1$ and $P^2$ are the same.

More specific examples of the compound represented by Formula (5) include a compound represented by Formula (6).

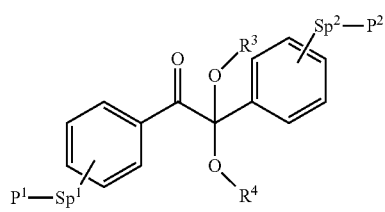

(6)

In Formula (6), $R^3$ represents C1-C4 linear or branched alkyl or alkenyl; $R^4$ represents C1-C4 linear or branched alkyl or alkenyl; $P^1$ and $P^2$ represent the same or different radical polymerizable groups; $Sp^1$ represents C1-C6 linear, branched or cyclic alkylene, alkyleneoxy, or carbonyloxy, or a direct bond; and $Sp^2$ represents C1-C6 linear, branched or cyclic alkylene, alkyleneoxy, or carbonyloxy, or a direct bond.

Specific examples of the compound represented by Formula (6) include a compound represented by Formula (7).

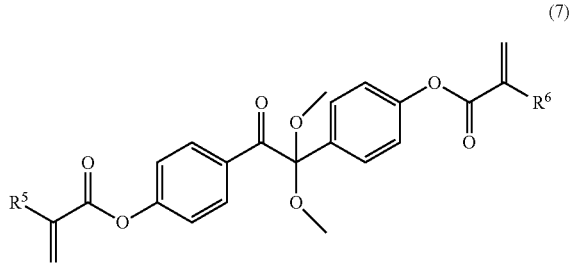

(7)

In Formula (7), $R^5$ and $R^6$ are the same as or different from each other and each represent hydrogen atom or methyl.

The compounds represented by Formulae (5) to (7) each have a structure (i) that generates radicals by irradiation with a wavelength component of not less than 340 nm, a structure (ii) that generates radicals by irradiation with a wavelength component of less than 400 nm, and a structure (iii) that has an absorption coefficient of not more than 20 ml/g·cm for a wavelength component of not less than 400 nm.

In the liquid crystal composition, namely in the liquid crystal composition before polymerization, the ratio of the polyfunctional monomer to the monofunctional monomer is not less than 1.5 mol % but less than 20 mol %, and the ratio of the polyfunctional monomer and the compound in total to the monofunctional monomer is not more than 20 mol %. If the ratios do not satisfy the above ranges, favorable alignment performance (e.g., vertical alignment) may not be achieved. The ratio of the polyfunctional monomer to the monofunctional monomer is more preferably not less than 5 mol % but not more than 15 mol %. The ratio of the polyfunctional monomer and the compound in total to the monofunctional monomer is more preferably not more than 18 mol %.

In the liquid crystal composition, namely in the liquid crystal composition before polymerization, the polyfunctional monomer preferably has a higher mol concentration than the compound. If the polyfunctional monomer has a mol concentration equal to or lower than that of the compound, the compound may not be integrated in the polymer to remain in liquid crystals as a monomer or oligomer, possibly adversely affecting the display quality. More specifically, when the liquid crystal composition is regarded to have a mol concentration of 100% by mass, the polyfunctional monomer has a mol concentration of preferably 0.01 to 0.4% by weight (more preferably 0.05 to 0.25% by weight) and the compound preferably has a mol concentration of 0.005 to 0.3% by weight (more preferably 0.01 to 0.2% by weight).

Another aspect of the present invention provides a liquid crystal display device including: a pair of substrates; a liquid crystal layer that contains liquid crystal molecules and is interposed between the pair of substrates; and an alignment control layer for perpendicularly aligning the liquid crystal molecules, the liquid crystal display device including substantially no alignment film, the alignment control layer being formed by polymerization of a monofunctional monomer and a polyfunctional monomer contained in a liquid crystal composition that contains the liquid crystal molecules, the monofunctional monomer, and the polyfunctional monomer, the polyfunctional monomer being represented by Formula (2), the monofunctional monomer being represented by Formula (1) (hereinafter, such a device is also referred to as a "second liquid crystal display device of the present invention").

The configuration of the second liquid crystal display device of the present invention is not especially limited as long as it essentially includes such components.

The preferable embodiments of the first liquid crystal display device of the present invention may be also applied to the second liquid crystal display device of the present invention. It is to be noted that the above embodiments may be combined as appropriate also in the case of the second liquid crystal display device of the present invention.

The present invention also relates to a method of favorably producing the first or second liquid crystal display device of the present invention.

Specifically, another aspect of the present invention provides a method of producing a liquid crystal display device, including a photoirradiation step for irradiating a liquid crystal composition interposed between a pair of substrates with light at not less than 340 nm to polymerize a monofunctional monomer and a polyfunctional monomer that generates radicals by irradiation with light at 340 nm or higher, both contained in the liquid crystal composition.

The step of the method of producing a liquid crystal display device of the present invention is not especially limited as long as it essentially includes such steps. Commonly, the method further includes the steps of enclosing the liquid crystal composition between the pair of substrates and performing annealing.

Similar embodiments as those described as preferable embodiments of the first liquid crystal display device of the present invention may be mentioned as preferable embodiments of a liquid crystal display device produced by the method of the present invention. These embodiments may be combined as appropriate. The following embodiment may be exemplified.

Specifically, the polyfunctional monomer is preferably represented by Formula (2).

Liquid crystal molecules used in the method preferably have negative dielectric anisotropy.

In the liquid crystal composition, namely in the liquid crystal composition before polymerization, the ratio of the polyfunctional monomer to the monofunctional monomer is preferably not less than 1.5 mol % but not more than 20 ml %.

The liquid crystal composition preferably further contains a compound that generates radicals by a self-cleavage reaction caused by photoirradiation. The alignment control layer is preferably formed by polymerization of the monofunctional monomer, the polyfunctional monomer, and the compound in the liquid crystal composition.

In the liquid crystal composition, namely in the liquid crystal composition before polymerization, the ratio of the polyfunctional monomer to the monofunctional monomer is preferably not less than 1.5 mol % but not more than 20 mol %. The ratio of the polyfunctional monomer and the compound in total to the monofunctional monomer is preferably not more than 20 mol %.

In the liquid crystal composition, namely in the liquid crystal composition before polymerization, the polyfunctional monomer preferably has a higher mol concentration than the compound.

The alignment control layer formed by photoirradiation preferably aligns the liquid crystal molecules perpendicularly.

In addition, the following embodiment may be mentioned as a preferable embodiment of the method of producing a liquid crystal display device of the present invention. It is to be noted that the following embodiment may be combined with the above embodiments as appropriate.

The liquid crystal composition may further contain a compound that generates radicals by a self-cleavage reaction caused by photoirradiation. In the photoirradiation step, the monofunctional monomer, the polyfunctional monomer, and the compound may be polymerized.

The liquid crystal composition can show a nematic phase and an isotropic liquid phase, and is preferably heated during the photoirradiation step at least at a temperature that is 30° C. lower than the phase transition temperature (Tni) from the nematic phase to the isotropic liquid phase of the liquid crystal composition. For example, if the temperature during the photoirradiation is a room temperature (30° C.), photoirradiation of at least 5000 mJ/cm² still cannot achieve the vertical alignment and the alignment state may not change at all. Since the monofunctional monomer and liquid crystal molecules have strong interaction, photoirradiation at a comparatively low temperature cannot achieve the vertical alignment. When the temperature is increased to facilitate molecular movement by heat energy, the monofunctional monomer is likely to be aligned perpendicularly. As a result, liquid crystal molecules can be more efficiently aligned perpendicularly. From this standpoint, the liquid crystal composition is preferably heated at least to a temperature that is 20° C. lower than Tni, and more preferably to a temperature not lower than Tni during the photoirradiation. The present inventors actually confirmed that, when the temperature during the photoirradiation was lower than Tni by 20° C., photoirradiation of 3000 mJ/cm² achieved the vertical alignment.

Advantageous Effects of Invention

The present invention provides a liquid crystal display device that is less likely to have display failures and excellent in reliability and light resistance in aging, and a method of producing the same.

DESCRIPTION OF EMBODIMENTS

The following embodiments are illustrated for specifically describe the present invention with reference to drawings. It should be noted that the present invention is not limited only to these embodiments.

Embodiment 1

Figure 1:
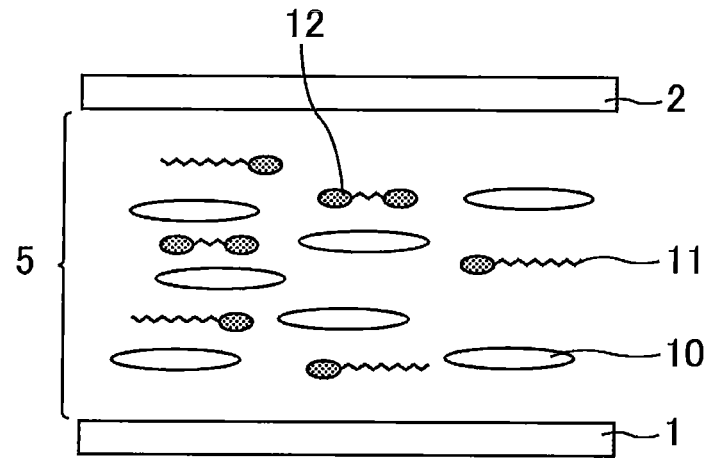
FIG. 1 is a cross-sectional schematic diagram of a liquid crystal display device according to Embodiment 1 before photoirradiation.
Figure 2:
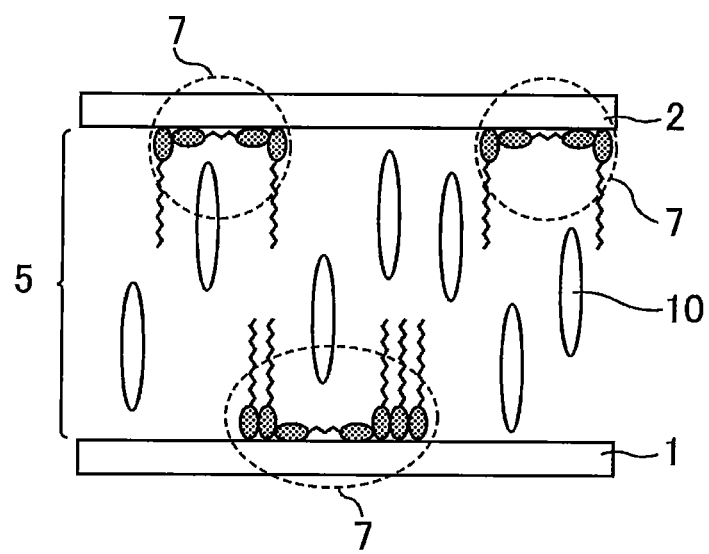
FIG. 2 is a cross-sectional schematic diagram of a liquid crystal display device according to Embodiment 1 after photoirradiation.

FIGS. 1 and 2 are cross-sectional schematic diagrams of a liquid crystal display device according to Embodiment 1. FIG. 1 shows a state before photoirradiation (polymerization) and FIG. 2 shows a state after photoirradiation (polymerization). As shown in FIGS. 1 and 2, a liquid crystal display device according to Embodiment 1 includes an array substrate 1, a color filter substrate 2, and a liquid crystal layer 5 interposed between a pair of substrates consisting of the array substrate 1 and the color filter substrate 2. The array substrate 1 includes an insulating transparent substrate made of glass or the like, various wirings formed on the transparent substrate, a pixel electrode, a TFT (Thin Film Transistor), and the like. The color filter substrate 2 includes an insulating transparent substrate made of glass or the like, a color filter formed on the transparent substrate, a black matrix, a common electrode, and the like.

The liquid crystal layer 5 contains liquid crystal molecules 10, a monofunctional monomer 11, and a polyfunctional monomer 12. Before photoirradiation, the liquid crystal layer 5 contains a prepared liquid crystal composition as it is. The liquid crystal molecules 10 may have positive or negative dielectric anisotropy. From the standpoint of producing a vertical alignment-type liquid crystal display device, the liquid crystal molecules 10 preferably have negative dielectric anisotropy. The monofunctional monomer 11 has a structure represented by Formula (1). Preferably, the polyfunctional monomer 12 generates radicals by annealing and photoirradiation at not less than 340 nm and has a structure represented by Formula (2).

In the entire liquid crystal composition forming the liquid crystal layer 5, namely, in 100% by weight of the liquid crystal composition, the amount of the monofunctional monomer 11 is 0.3 to 4.0% by weight. The amount of the polyfunctional monomer 12 is 0.01 to 0.5% by weight. In addition, in the liquid crystal composition, the ratio of the polyfunctional monomer 12 to the monofunctional monomer 11 is preferably not less than 1.5 mol % but not more than 20 mol %.

A description is given on a method of producing the liquid crystal display device of Embodiment 1 in the following.

The substrates 1 and 2 are attached to each other with a sealing material and the liquid crystal composition is injected to the gap therebetween in vacuo. Then, the inlet was sealed with, for example an UV light-curable resin, thereby forming a liquid crystal cell (enclosing step). Alternatively, after dropwise addition of the liquid crystal composition to one of the substrates 1 and 2 in vacuo, the other substrate may be attached thereto to form a liquid crystal cell.

Next, the liquid crystal cell is heated in an oven or the like for thermal annealing at a predetermined temperature for a predetermined time (annealing step). In this step, the liquid crystal cell is preferably heated to a temperature not lower than the phase transition temperature (Tni) from the nematic phase to the isotropic liquid phase of the liquid crystal composition. More specifically, heating is preferably performed at not lower than 100° C. but not higher than 140° C. for 1 to 60 minutes. In the present embodiment, the thermal annealing is not essential but is preferably performed before the photoirradiation step from the standpoint of stabilizing the alignment.

The liquid crystal cell, especially the liquid crystal composition, at a temperature exceeding the ambient temperature is irradiated with light at not less than 340 nm (photoirradiation step).

The polyfunctional monomer 12 generates radicals mainly by photoirradiation at not less than 340 nm. The radicals serve as main active species to initiate and progress chain polymerization of polymerizable groups in the monofunctional monomer 11 and the polyfunctional monomer 12 one after another. The resulting polymers are deposited on the substrates 1 and 2 to form an alignment control layer (polymer layer) 7 by phase separation as shown in FIG. 2. Blocking light at less than 340 nm enables to form the alignment control layer 7 excellent in vertical alignment performance while avoiding deterioration of a liquid crystal display device. In FIG. 2, plural spotty alignment control layers 7 are formed on the substrates 1 and 2. Alternatively, the alignment control layer 7 may be formed to cover the substrates 1 and 2 or formed as a network throughout the liquid crystal layer 5.

In the photoirradiation step, light (polarized or unpolarized UV light) at not less than 340 nm is radiated until an alignment control layer is formed. More specifically, photoirradiation of 0.1 to 10 J/cm$^2$ is performed. The photoirradiation step is carried out at a temperature exceeding the ambient temperature, preferably at least at a temperature that is 30° C. lower than Tni. This achieves the vertical alignment by comparatively small energy of light. More specifically, during the photoirradiation step, the liquid crystal cell, especially the liquid crystal composition, is preferably maintained at a temperature of not lower than 100° C. but not higher than 140° C. Provided that the liquid crystal composition is maintained at a temperature exceeding the ambient temperature during the photoirradiation, heating may or may not be conducted during the photoirradiation. As a case (1), photoirradiation and heating may be simultaneously performed. As a case (2), heating may be performed before the photoirradiation step, and after termination of heating, photoirradiation may be performed at a temperature exceeding the ambient temperature (preferably at least at a temperature that is 30° C. lower than Tni). Exemplary heating means in the case (1) include a hot plate, and exemplary heating means in the case (2) include an oven and a hot plate.

The polyfunctional monomer 12 also generates radicals in the case where photoirradiation at not less than 340 nm is not performed and only annealing (heat treatment) is performed. Accordingly, the alignment control layer 7 is presumably formed only by annealing without the photoirradiation step. In that case, however, the amount of generated radicals is smaller than the case where photoirradiation is performed. Photoirradiation at not less than 340 nm is therefore preferably performed. In the case where only annealing is performed, the liquid crystal composition is preferably heated at least to a temperature that is 30° C. lower than Tni.

Next, the liquid crystal cell is heated in an oven and the like again for thermal annealing at a predetermined temperature for a predetermined time. At this time, the liquid crystal cell is preferably heated to a temperature higher than the phase transition temperature (Tni) from the nematic phase to the isotropic liquid phase of the liquid crystal composition. More specifically, the liquid crystal cell is heated to not lower than 100° C. but not higher than 140° C. for 1 to 60 minutes.

In Embodiment 1, for example, in the case where the photoirradiation step is conducted while a voltage of not lower than the threshold voltage is applied to the liquid crystal layer 5, polymers are formed as to follow liquid crystal molecules aligned under application of a voltage not lower than the threshold voltage. In such a case, the formed alignment control layer has a structure that makes the liquid crystal molecules have an initial pre-tilt angle in a state where no voltage is applied. Here, even in a case where a voltage not lower than the threshold voltage was not applied to the liquid crystal layer 5 in the photoirradiation step, an alignment control layer having an vertical alignment force can be formed, provided that the monofunctional monomer 11 and the polyfunctional monomer 12 in Embodiment 1 are used.

As shown in FIGS. 1 and 2, in Embodiment 1, both the array substrate 1 and the color filter substrate 2 have substantially no alignment film. A sealing material is directly applied to the substrates 1 and 2 along the outlines thereof, and the liquid crystal layer 5 is enclosed between the array substrate 1 and the color filter substrate 2 by the sealing material. Photoirradiation of the liquid crystal layer 5 is performed after the liquid crystal layer 5 is sealed by the sealing material, and therefore, the alignment control layer 7 is formed within a region surrounded by the sealing material.

After these processes, various driving circuits, a backlight unit, and the like are mounted to the liquid crystal cell in which the alignment control layer 7 is formed, thereby producing a liquid crystal display device of Embodiment 1.

Electrical and mechanical defects in the liquid crystal display device after the production thereof can be detected by continuous irradiation (aging) with light emitted from the mounted backlight unit for 100 to 1000 hours.

In Embodiment 1, the alignment of liquid crystal molecules may also be determined by linear slits provided in a pixel electrode of the array substrate 1 or a common electrode of the color filter substrate 2. In the case where thin linear slits are formed in the pixel electrode and/or common electrode, liquid crystal molecules are all aligned towards the linear slits upon application of the voltage. Accordingly, an alignment control layer that makes liquid crystal molecules have a pre-tilt angle can be formed by polymerization of the monofunctional monomer 11 and the polyfunctional monomer 12 under application of a voltage not smaller than the threshold voltage to the liquid crystal layer 5.

Figure 3:
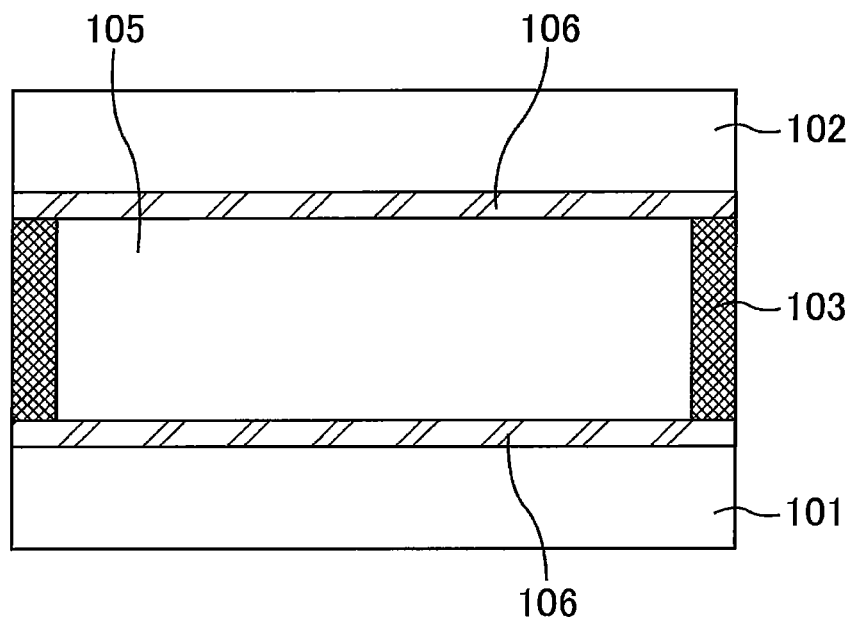
FIG. 3 is a cross-sectional schematic diagram of a liquid crystal display device having an alignment film according to a reference example.

For reference, the configuration of a liquid crystal display device having an alignment film is described based on FIG. 3. In the example shown in FIG. 3, an array substrate 101 and a color filter substrate 102 each have an alignment film 106 formed of a polymeric material (polyimide) having a main chain containing an imide structure. The alignment film 106 with a surface subjected to alignment treatment such as rubbing or photoalignment enables to make the pre-tilt angle of liquid crystal molecules perpendicular to or in parallel with the substrates (make the liquid crystal molecules have an initial slope). The alignment film 106 may be one capable of making the pre-tilt angle of the liquid crystal molecules perpendicular to or in parallel with the substrates without alignment treatment. Between the array substrate 101 and the color filter substrate 102, a sealing material 103 is directly applied to the substrates 101 and 102 along the outlines thereof. The liquid crystal layer 105 is enclosed between the array substrate 101 and the color filter substrate 102 by the sealing material 103. The alignment film 106 needs to be formed prior to the sealing with the sealing material 103 by application of a polyimide solution or the like, and therefore, the alignment film 106 is also formed under the sealing material 103.

The liquid crystal display device according to Embodiment 1 does not have a structure corresponding to the alignment film 106, and liquid crystal molecules are perpendicularly aligned by the alignment control layer 7 as described above.

Embodiment 2

Figure 4:
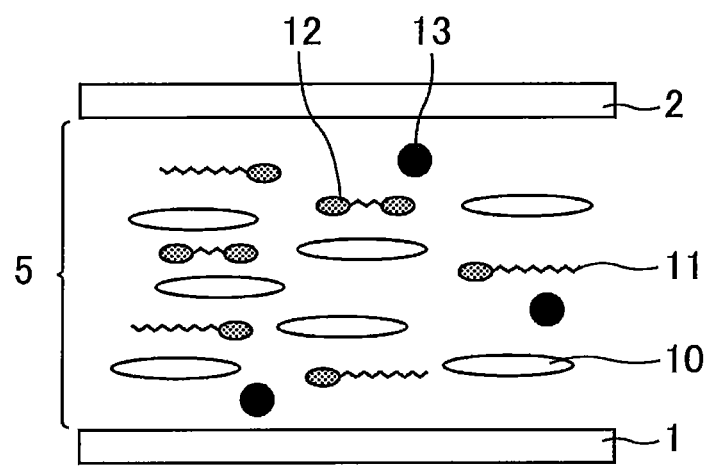
FIG. 4 is a cross-sectional schematic diagram of a liquid crystal display device according to Embodiment 2 before photoirradiation.
Figure 5:
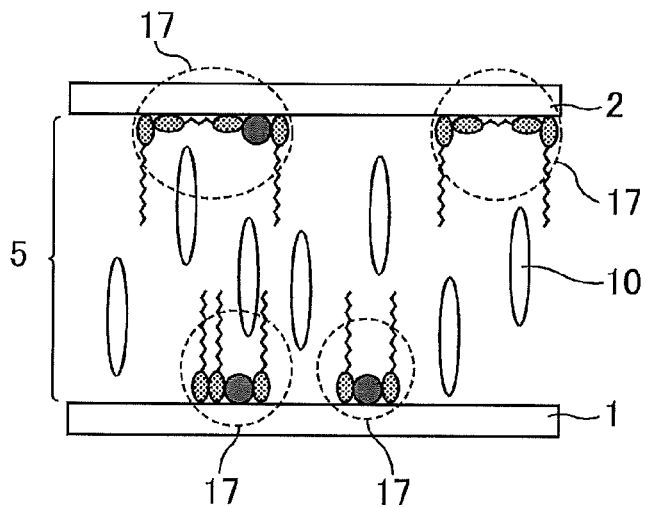
FIG. 5 is a cross-sectional schematic diagram of a liquid crystal display device according to Embodiment 2 after photoirradiation.

FIGS. 4 and 5 each are a cross-sectional schematic diagram of a liquid crystal display device according to Embodiment 2. FIG. 4 shows a state before photoirradiation (polymerization) and FIG. 5 shows a state after photoirradiation (polymerization). In Embodiment 1, the liquid crystal layer 5 contains the monofunctional monomer 11 and the polyfunctional monomer 12, and the alignment control layer 7 is formed by photoirradiation of the liquid crystal layer 5. In Embodiment 2, the liquid crystal layer 5 before polymerization, namely, a liquid crystal composition contains the monofunctional monomer 11, the polyfunctional monomer 12, and a compound 13. The compound 13 is a compound that generates radicals by a self-cleavage reaction (a polymerization initiator with polymerizable groups). In Embodiment 2, as shown in FIGS. 4 and 5, the alignment control layer 17 is formed in the photoirradiation step by polymerization of the monofunctional monomer 11, the polyfunctional monomer 12, and the compound 13 initiated by photoirradiation of the liquid crystal layer 5.

The compound 13 used in Embodiment 2 may be, for example, a compound represented by Formula (5). The compound represented by Formula (5) may be specifically a compound represented by Formula (6). The compound represented by Formula (6) may be specifically a compound represented by Formula (7).

The compounds represented by Formulae (5) to (7) each have a structure that generates radicals by self-cleavage, and therefore, simply conducting photoirradiation efficiently initiates polymerization. Even with generation of impurities that are easily charged electrically and presumably derived from the polymerization initiator, since formation of an alignment control layer by bonded polymerizable groups causes phase separation, image sticking is less likely to occur compared to a case of forming an alignment control layer using a polymerization initiator that contains no polymerizable group.

In Embodiment 2, in the entire liquid crystal composition forming the liquid crystal layer 5, namely in 100% by weight of the liquid crystal composition, the amount of the monofunctional monomer 11 is 0.3 to 4.0% by weight. The amount of the polyfunctional monomer 12 is 0.01 to 0.5% by weight. The amount of the compound 13 is 0.001 to 0.3% by weight. In the liquid crystal composition, the ratio of the polyfunctional monomer 12 to the monofunctional monomer 11 is not less than 1.5 mol % but less than 20 mol %, the ratio of the polyfunctional monomer 12 and the compound 13 in total to the monofunctional monomer is not more than 20 mol %.

Other component members of the liquid crystal display devices according to Embodiments 1 and 2 are now specifically described.

The liquid crystal display devices according to Embodiments 1 and 2, and liquid crystal display devices produced by the method of producing the liquid crystal display device according to Embodiments 1 and 2 provide excellent display properties when used for display equipment such as TVs, PCs, mobile phones, and information displays.

In the liquid crystal display devices according to Embodiments 1 and 2, the array substrate 1, the liquid crystal layer 5, and the color filter substrate 2 are stacked in the stated order from the rear side toward the screen side of the liquid crystal display device. On the rear side of the array substrate 1, a polarizer is provided. Also on the screen side of the color filter substrate 2, a polarizer is provided. For these polarizers, a retardation plate may be further provided. The polarizers may be circularly polarizing plates.

The liquid crystal display devices according to Embodiments 1 and 2 may be of transmission type, reflection type, or transmission/reflection dual-purpose type. In the case of transmission or transmission/reflection dual-purpose type, the liquid crystal display devices of Embodiments 1 and 2 further includes a back light unit. The back light unit is arranged on the further rear side than the array substrate 1 in such a manner that light passes through the array substrate 1, the liquid crystal layer 5, and the color filter substrate 2 in the stated order. In the case of reflection or transmission/reflection dual-purpose type, the array substrate 1 has a reflector for reflecting external light. At least in a region where the reflected light is used for display, the polarizer of the color filter substrate 2 needs to be a circularly polarizing plate having a so-called λ/4 retardation plate.

The liquid crystal display devices according to Embodiments 1 and 2 each may be a color filter-on-array device in which the array substrate has a color filter. The liquid crystal display device according to Embodiments 1 and 2 may also be monochrome display devices. In such a case, a color filter is not needed.

The liquid crystal layer 5 is filled with a liquid crystal composition that aligns in a specific direction by application of a certain voltage. The alignment of liquid crystal molecules in the liquid crystal layer 5 is controlled by application of a voltage not smaller than the threshold voltage. The alignment mode of liquid crystal molecules in Embodiments 1 and 2 may be the VA mode, for example, and is not particularly limited. In the case of using the monofunctional monomer represented by Formula (1), a mode in which the initial alignment is the vertical alignment, such as the VA mode, is preferably employed as an excellent vertical alignment force is achieved.

In the case of the liquid crystal display devices according to Embodiments 1 and 2, the liquid crystal display device (e.g., mobile phone, monitor, liquid crystal TV (television), and information display) may be dismantled and subjected to chemical analysts by nuclear magnetic resonance analysis (NMR), Fourier transform infrared spectroscopy (FT-IR), or Mass spectroscopy (MS). This process allows analysis of monomer components present in the alignment control layer and determination of the ratio of the monomer components present in the alignment control layer and the amount of monomers for forming the alignment control layer contained in the liquid crystal layer.

The liquid crystal display devices of Embodiments 1 and 2 can employ any mode that provides an alignment control structure capable of inclining liquid crystal molecules in a predetermined direction relative to the substrate faces under application of voltage and/or no voltage. Specifically, employable modes include: the MVA (Multi-domain Vertical Alignment) mode that controls the alignment of liquid crystal molecules using wall-like (linear in a plan shape) dielectric protrusions (ribs) provided, as a protrusive member that controls the alignment, on the electrode towards the liquid crystal layer and slits provided on the electrode; the PVA (Patterned Vertical Alignment) mode alignment that controls the alignment of liquid crystal molecules using slits provided, as a protrusive member that controls the alignment, in electrodes of the both substrates; the CPA (Continuous Pinwheel Alignment) mode that controls the alignment of liquid crystal molecules using pillar-shaped (dot-shaped in a plan view) structures (rivets) provided, as a protrusive dielectric, on the electrode or holes formed in the electrode; and the TBA (Transverse Bend Alignment) mode that controls the alignment of liquid crystal molecules, which are perpendicularly aligned under application of no voltage, by generating a transverse electric field using a comb-shaped electrode. Providing these structures stabilizes the alignment of liquid crystal molecules, reducing the possibility of display failures.

Example 1

The following will discuss Example 1 in which a liquid crystal cell of the liquid crystal display device according to Embodiment 1 is actually produced. A pair of substrates was prepared. After cleaning of the substrates, a sealing material was applied to one substrate. Beads were dispersed on the other substrate and the two substrates were then attached to each other. To the gap between the pair of substrates, a liquid crystal composition containing liquid crystal molecules having negative dielectric anisotropy, a monofunctional monomer, and a polyfunctional monomer (bifunctional monomer) was injected. The sealing material may be any of those cured by heat, cured by UV irradiation, and cured by both heat and UV irradiation. A sealing material used in Example 1 was curable by both heat and UV irradiation.

For the liquid crystal composition, 4-acryloyloxybutoxy-4'-octyloxybiphenyl that is a monofunctional monomer represented by Formula (8) and 2,7-dimethacryloxyphenanthrene that is a polyfunctional monomer represented by Formula (9) were used in combination. The monofunctional monomer represented by Formula (8) has biphenyl. Because of this, an alignment control layer that aligns the major axes of liquid crystal molecules with a strong alignment force in a direction along the side chain of the polymer can be formed. The monofunctional monomer represented by Formula (8) has a linear structure from biphenyl to the alkyl chain end. Because of this, an alignment control layer that aligns liquid crystal molecules with a stable alignment force can be formed. The binding power of the alignment control layer is enhanced by the crosslinks derived from the bifunctional monomer represented by Formula (9), providing a more stable vertical alignment force.

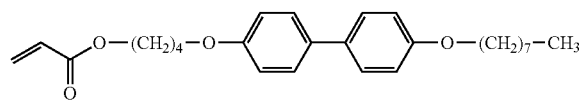

(8)

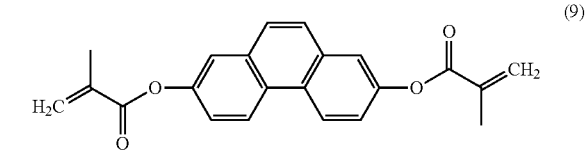

(9)

Sample 1 prepared was a liquid crystal composition containing 1.2% by weight of a monofunctional monomer and 0.01% by weight of a polyfunctional monomer. Sample 2 prepared was a liquid crystal composition containing 1.2% by weight of a monofunctional monomer and 0.05% by weight of a polyfunctional monomer. Sample 3 prepared was a liquid crystal composition containing 1.2% by weight of a monofunctional monomer and 0.1% by weight of a polyfunctional monomer. Sample 4 prepared was a liquid crystal composition containing 1.2% by weight of a monofunctional monomer and 0.2% by weight of a polyfunctional monomer. Table 1 shows formulations of Samples 1 to 4. In all the samples, the amount of each monomer is based on 100% by weight of the liquid crystal composition.

TABLE 1

| | Sample 1 | Sample 2 | Sample 3 | Sample 4 |
|---|---|---|---|---|
| Monofunctional monomer (% by weight) | 1.2 | 1.2 | 1.2 | 1.2 |
| Polyfunctional monomer (% by weight) | 0.01 | 0.05 | 0.1 | 0.2 |

After injection of the liquid crystal composition, annealing was performed at 100° C. for an hour. The liquid crystal composition has a Tni of lower than 100° C. Next, while the temperature was kept at 100° C., the substrate was irradiated with unpolarized UV light (0.25 mW/cm$^2$) in a normal direction relative to the substrate until the vertical alignment was achieved. The light source was a black light lamp (FHF-32BLB, TOSHIBA Lighting & Technology Corporation) having a peak wavelength of about 350 nm. The electrodes were plane electrodes without slits. During the polymerization reaction, no voltage was applied to the liquid crystal cell.

After the photoirradiation, annealing was performed at 100° C. for one hour.

The VHR of the liquid crystal cell produced by the above process was measured. The VHR was measured using a LC material characteristics measurement system Model 6254 (product of TOYO Corporation). The liquid crystal cell was placed in an oven at 70° C. and an electric charge was applied between electrodes under a voltage of 1 V for 60 μs. Then, the electric potential between the electrodes was measured in the opening period (period during which no voltage was applied) for 16.67 ms, thereby determining the percentage of the retained charge.

The VHR was also measured before UV irradiation of the liquid crystal composition. After UV irradiation of the liquid crystal composition, the liquid crystal cell was aged on the LED back light unit for 1000 hours. Then, the VHR was again measured.

Table 2 shows energies of UV light required for achievement of the vertical alignment and the VHR of Samples 1 to 4. Table 3 shows the mol concentrations of the polyfunctional monomer relative to the monofunctional monomer in Samples 1 to 4.

tion of about 2000 to 3000 mJ/cm$^2$ as in the case of Samples 2 and 3 shown in Table 2. Moreover, aging on the back light unit is likely to improve the VHR, so that the light resistance is enhanced. Consequently, a highly reliable liquid crystal display device can be produced.

As shown in Tables 2 and 3, the vertical alignment was not achieved in the case where the concentration of the polyfunctional monomer relative to the monofunctional monomer was 1.4 mol % (Sample 1), and in the case where the concentration of the polyfunctional monomer relative to the monofunctional monomer was 20.5 mol % (Sample 4). If the mol concentration of the polyfunctional monomer relative to the monofunctional monomer is too low, the vertical alignment is not achieved because polymerization does not occur. If the mol concentration of the polyfunctional monomer relative to the monofunctional monomer is too high, polyfunctional monomers are problematically polymerized with each other to immobilize liquid crystal molecules randomly, failing to achieve the vertical alignment. Accordingly, the concentration of the polyfunctional monomer relative to the monofunctional monomer is preferably not less than 1.5 mol % but less than 20 mol %.

As shown in Table 2, within the range that allows the vertical alignment, as the concentration of the polyfunctional monomer decreases, the energy of UV light required for the vertical alignment tends to increase. In contrast, as the concentration of the polyfunctional monomer increases, the VHR tends to decrease. Accordingly, the optimal concentration may be set from the standpoint of alignment properties and the VHR.

Comparative Example 1

In Comparative Example 1, a liquid crystal cell was prepared in the same manner as in Example 1, except that

TABLE 2

|  | Sample 1 | Sample 2 | Sample 3 | Sample 4 |
|---|---|---|---|---|
| Energy of UV light required for achievement of vertical alignment (mJ/cm$^2$) | — (vertical alignment not achieved) | 3000 | 2300 | — (vertical alignment not achieved) |
| VHR before irradiation (%) | 99.9 | 99.9 | 99.9 | — |
| VHR after irradiation (%) | 99.1 | 97.3 | 94.6 | — |
| VHR after aging (%) | 99.1 | 98.6 | 97.7 | — |

TABLE 3

| | Mol concentration of polymfunctional monomer relative to monofunctional monomer (mol %) | | | |
|---|---|---|---|---|
| | 1.4 | 5.4 | 10.3 | 20.5 |
| Alignment | Bad (vertical alignment not achieved) | Good (vertical alignment achieved) | Good (vertical alignment achieved) | Bad (vertical alignment not achieved) |

Figure 6:
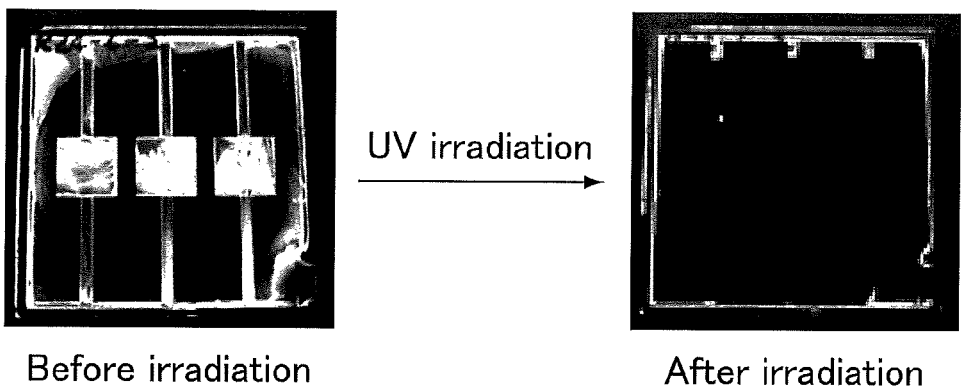
FIG. 6 is a view showing states of a liquid crystal cell of Sample 3 according to Example 1 before and after UV irradiation.

FIG. 6 is a view showing states of a liquid crystal cell of Sample 3 according to Example 1 before and after UV irradiation. The liquid crystal cell was provided with polarizers arranged in the crossed Nicols. As shown in FIG. 6, significantly favorable vertical alignment was achieved without generation of bright lines.

Figure 8:
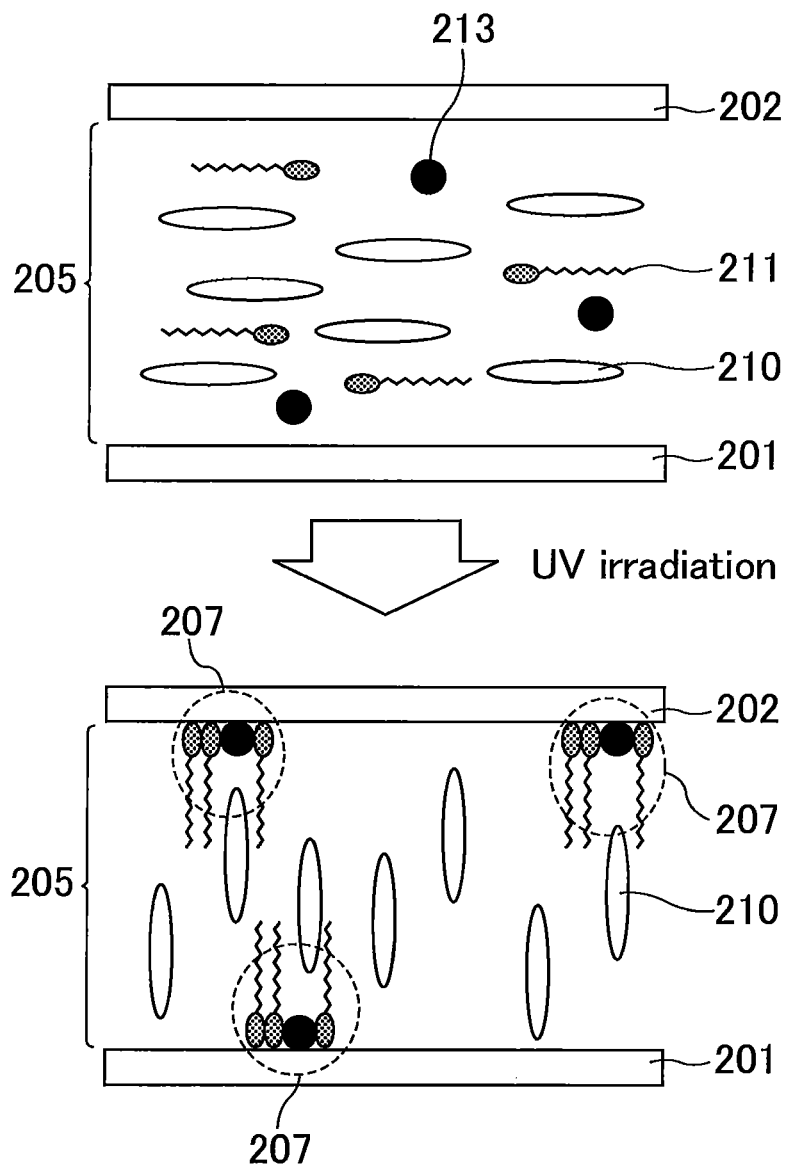
FIG. 8 is a cross-sectional schematic diagram of a liquid crystal display device according to Comparative Example 1 showing states thereof before and after photoirradiation.
Figure 9:
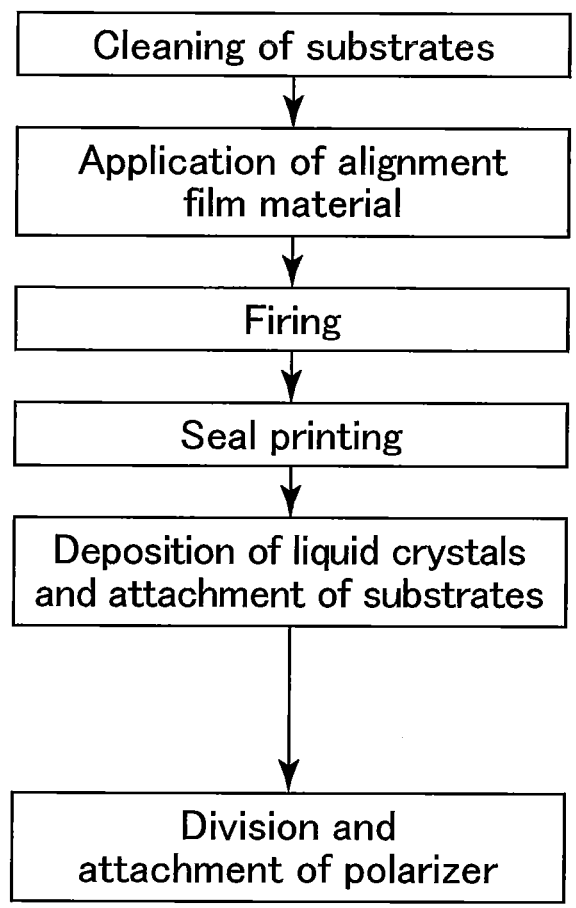
FIG. 9 is a flowchart showing an exemplary process of producing a conventional liquid crystal display device.
Figure 10:
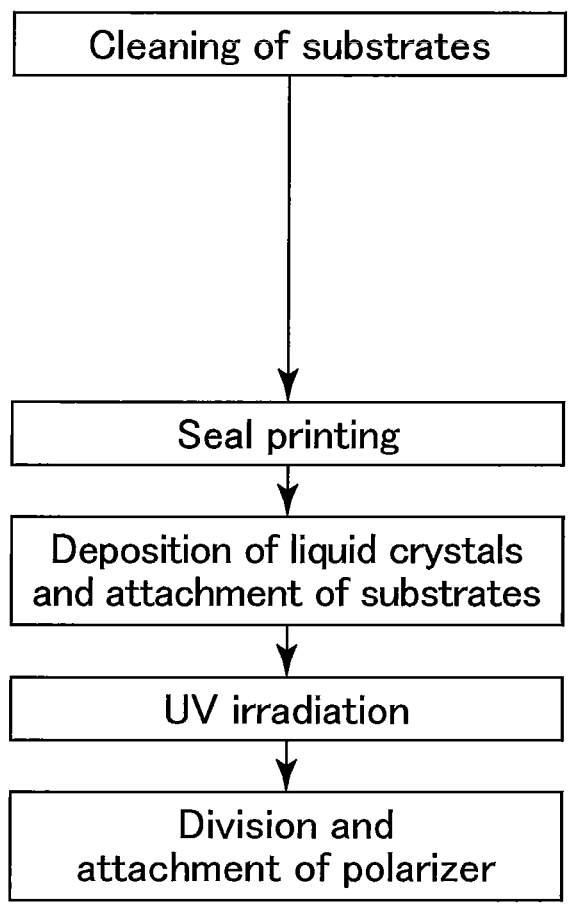
FIG. 10 is a flowchart showing an exemplary process of producing a first liquid crystal display device of the present invention.

As disclosed in Patent Literatures 1 and 2, in the case of using a bifunctional monomer having phenyl, biphenyl, or a steroid skeleton as a polyfunctional monomer, light at 310 nm is needed for polymerization and the required energy of light is not less than 9000 mJ/cm$^2$. In contrast, in the case of using a bifunctional monomer having a phenanthrene skeleton, polymerization is initiated by light at not less than 340 nm and the vertical alignment is achieved by photoirradia- IRGACURE 651 that is a polymerization initiator was added to the liquid crystal composition in an amount of 0.03% by weight, instead of 2,7-dimethacryloxyphenanthrene that is a polyfunctional monomer represented by Formula (9). Specifically, in the liquid crystal cell of Comparative Example 1, as shown in FIG. 8, an alignment control layer 207 formed of a monofunctional monomer 211 (4-acryloyloxybutoxy-4'-octyloxybiphenyl) and a polymerization initiator 213 (IRGACURE 651) was formed by UV irradiation. Table 4 shows difference between Sample of Comparative Example 1 and Sample 2 of Example 1.

TABLE 4

|  | Comparative Example 1 | Example 1 (Sample 2) |
|---|---|---|
| Polyfunctional monomer | not used | used (Phenenthrene monomer) (0.05% by weight) |
| Polymerization initiator | Irgacure 651 (0.03% by weight) | not used |

Table 5 shows the energy of UV light required for achievement of the vertical alignment and the VHR before and after photoirradiation and after aging of the liquid crystal cells of Comparative Example 1 and Sample 2 of Example 1. As shown in Table 5, in the case of using the polymerization initiator of Comparative Example 1, UV irradiation until the vertical alignment was achieved lowered the VHR to 69.3%, and aging further lowered the VHR. In contrast, in the case of using the bifunctional monomer of Example 1, the VHR was kept as high as 97.3% even after UV irradiation until the vertical alignment was achieved. In addition, after aging, the VHR was improved to 98.6%.

TABLE 5

|  | Comparative Example 1 | Example 1 (Sample 2) |
| --- | --- | --- |
| Energy of UV light required for achievement of vertical alignment (mJ/cm$^2$) | 700 | 3000 |
| VHR before irradiation (%) | 99.9 | 99.9 |
| VHR after irradiation (%) | 69.3 | 97.3 |
| VHR after aging (%) | 69.3 or less | 98.6 |

Example 2

The following will discuss Example 2 in which a liquid crystal cell of the liquid crystal display device according to Embodiment 2 was actually produced. To the liquid crystal composition were added 4-acryloyloxybutoxy-4'-octyloxybiphenyl that is a monofunctional monomer represented by Formula (8) and 2,7-dimethacryloxyphenanthrene that is a polyfunctional monomer represented by Formula (9). Moreover, further added was a compound that has a radical polymerizable group and generates radicals by a self-cleavage reaction represented by Formula (10) (a polymerization initiator with a polymerizable group) was added. In this manner, a liquid crystal cell of Example 2 was produced.

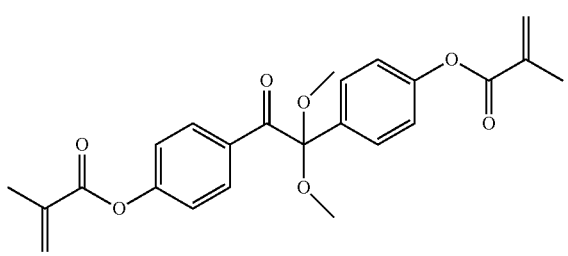

(10)

Sample 5 prepared was a liquid crystal composition containing 1.2% by weight of a monofunctional monomer, 0.1% by weight of a polyfunctional monomer, and 0.1% by weight of a polymerization initiator with a polymerizable group. Sample 6 prepared was a liquid crystal composition containing 1.2% by weight of a monofunctional monomer, 0.05% by weight of a polyfunctional monomer, and 0.02% by weight of a polymerization initiator with a polymerizable group. Table 6 shows formulations of Samples 5 and 6. In any of the samples, the amounts of respective monomers and the polymerization initiator were based on 100% by weight of the liquid crystal composition.

TABLE 6

|  | Sample 5 | Sample 6 |
| --- | --- | --- |
| Monofunctional monomer (% by weight) | 1.2 | 1.2 |
| Polyfunctional monomer (% by weight) | 0.1 | 0.05 |
| Polymerization initiator with polymerizable group (% by weight) | 0.1 | 0.02 |

Other conditions and processes were the same as those in Example 1.

Table 7 shows energies of UV light required for achievement of the vertical alignment and the VHR of Samples 5 and 6.

TABLE 7

|  | Sample 5 | Sample 6 |
| --- | --- | --- |
| Energy of UV light required for achievement of vertical alignment (mJ/cm$^2$) | — (vertical alignment not achieved) | 700 |
| VHR before irradiation (%) | 99.9 | 99.9 |
| VHR after irradiation (%) | 92.6 | 97.9 |
| VHR after aging (%) | 95.7 | 98.9 |

Figure 7:
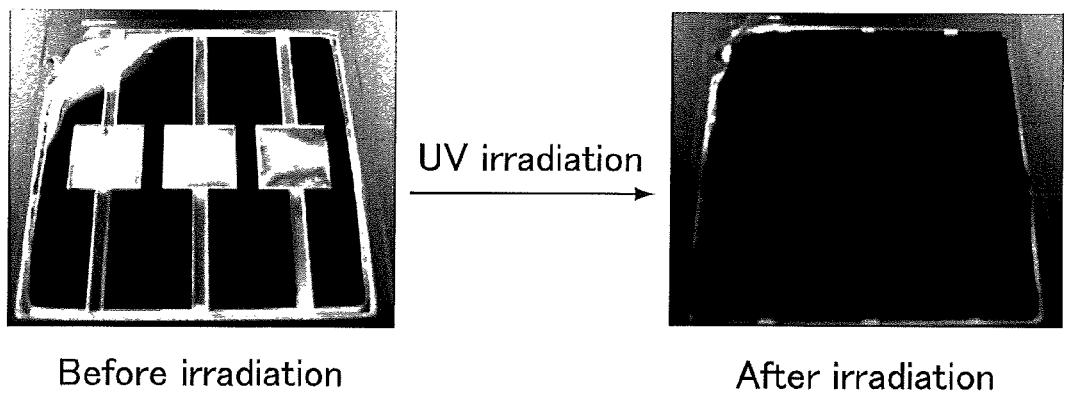
FIG. 7 is a view showing states of a liquid crystal cell of Sample 6 according to Example 2 before and after UV irradiation.

FIG. 7 is a view showing states of a liquid crystal cell of Sample 6 according to Example 2 before and after UV irradiation. The liquid crystal cell was provided with polarizers arranged in the crossed Nicols. As shown in FIG. 7, significantly favorable vertical alignment was achieved without generation of bright lines.

As disclosed in Patent Literatures 1 and 2, in the case of using a polyfunctional monomer such as a bifunctional monomer having phenyl, biphenyl, or a steroid skeleton, light at 310 nm is needed for polymerization and photoirradiation of not less than 9000 mJ/cm$^2$ is needed. In contrast, in the case of using a bifunctional monomer having a phenanthrene skeleton and a polymerization initiator with a polymerizable group, polymerization is initiated by light at not less than 340 nm and the vertical alignment is achieved by photoirradiation of about 700 mJ/cm$^2$ as in the case of Sample 6 in Table 7. Moreover, aging on the back light unit is likely to improve the VHR, so that the light resistance is enhanced. Consequently, a highly reliable liquid crystal display device can be produced. As described above, radicals derived from a polymerization initiator with a polymerizable group promotes a polymerization reaction to further reduce the required energy of light compared to the case of Samples 2 and 3 of Example 1.

In the case where the concentration of a polyfunctional monomer and a polymerization initiator with a polymerizable group relative to a monofunctional monomer was 20 mol % (Sample 5), the vertical alignment was not achieved. In conjunction with the results of Example 1, the total concentration of a polyfunctional monomer and a polymerization initiator with a polymerizable group relative to a monofunctional monomer is preferably not less than 1.5 mol % but not more than 20 mol %.

If the mol concentration of a polymerization initiator with a polymerizable group is too high, the polymerization initiator with a polymerizable group is not completely reacted so that a large portion thereof remains in the liquid crystal layer. In such a case, the display quality may be adversely affected. Accordingly, the mol concentration of a polyfunctional monomer is preferably higher than that of a polymerization initiator with a polymerizable group.

Example 3

A liquid crystal cell of Example 3 was prepared by adding to a liquid crystal composition a polyfunctional monomer represented by Formula (11) and 2,7-dimethacryloxy-phenanthrene that is a polyfunctional monomer represented by Formula (9).

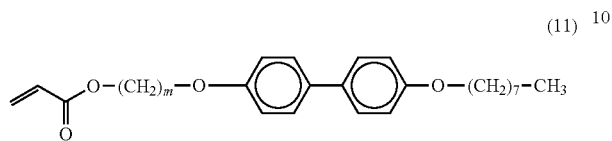

(11)

To a liquid crystal composition were added 1.2% by weight of a monofunctional monomer and 0.05% by weight of a polyfunctional monomer. Sample 7 was one containing the monofunctional monomer of Formula (11) in which m is 0, Sample 8 was one containing the monofunctional monomer of Formula (11) in which m is 2, Sample 9 was one containing the monofunctional monomer of Formula (11) in which m is 4, and Sample 10 was one containing the monofunctional monomer of Formula (11) in which m is 8. Table 8 shows formulations of Samples 7 to 10. In any of the samples, the amounts of respective monomers are based on 100% by weight of the liquid crystal composition.

TABLE 8

| | Sample 7 | Sample 8 | Sample 9 | Sample 10 |
|---|---|---|---|---|
| Monofunctional monomer (m = 0) (% by weight) | 1.2 | — | — | — |
| Monofunctional monomer (m = 2) (% by weight) | — | 1.2 | — | — |
| Monofunctional monomer (m = 4) (% by weight) | — | — | 1.2 | — |
| Monofunctional monomer (m = 8) (% by weight) | — | — | — | 1.2 |
| Polyfunctional monomer (% by weight) | 0.05 | 0.05 | 0.05 | 0.05 |

Other conditions and processes were the same as those in Example 1.

Table 9 shows energies of UV light required for achievement of the vertical alignment and the VHR of Samples 7 to 10.

TABLE 9

| | Sample 7 | Sample 8 | Sample 9 | Sample 10 |
|---|---|---|---|---|
| Energy of UV light required for achievement of vertical alignment (mJ/cm$^2$) | 700 | 3000 | 3000 | 3000 |
| VHR before irradiation (%) | 99.9 | 99.9 | 99.9 | 99.9 |
| VHR after irradiation (%) | 96.1 | 97.0 | 97.3 | 97.5 |
| VHR after aging (%) | 96.5 | 98.1 | 98.6 | 98.9 |

As a result of evaluations of materials containing the monofunctional monomer different in the number of spacers between the polymerizable group and the core (m=0, 2, 4, 8) shown in Table 9, the vertical alignment was achieved and the VHR was kept high even after achievement of the vertical alignment in all the materials. Moreover, aging on the back light unit is likely to improve the VHR as the materials contain a polyfunctional monomer, so that the light resistance was enhanced. Consequently, a highly reliable liquid crystal display device can be produced.

From the standpoint of further improving the VHR, m is not preferably 0.

The present application claims priority to Patent Application No. 2011-211558 filed in Japan on Sep. 27, 2011 under the Paris Convention and provisions of national law in a designated State, the entire contents of which are hereby incorporated by reference.

REFERENCE SIGNS LIST 1, 101, 201: Array substrate
2, 102, 202: Color filter substrate
103: Sealing material
4: Monomer
5, 105, 205: Liquid crystal layer
7, 17, 207: Alignment control layer (polymer layer)
10, 210: Liquid crystal molecule
11, 211: Monofunctional monomer
12: Polyfunctional monomer
13: Compound (polymerization initiator with a polymerizable group)
106: Alignment film
213: Polymerization initiator

The invention claimed is:
1. A liquid crystal display device, comprising:
a pair of substrates;
a liquid crystal layer containing liquid crystal molecules and interposed between the pair of substrates; and
an alignment control layer for perpendicularly aligning the liquid crystal molecules, wherein:
the liquid crystal display device includes substantially no alignment film;
the alignment control layer includes a monofunctional monomer, a polyfunctional monomer, and a polymerization initiator that are polymerized while a liquid crystal composition containing the liquid crystal molecules, the monofunctional monomer, the polyfunctional monomer, and the polymerization initiator, is interposed between the pair of substrates;
the polymerization initiator generates radicals by a self-cleavage reaction caused by photoirradiation and includes at least two radical polymerizable groups;
the polyfunctional monomer generates a radical by annealing and irradiation with light at not less than 340 nm;
the monofunctional monomer is represented by Formula (1):

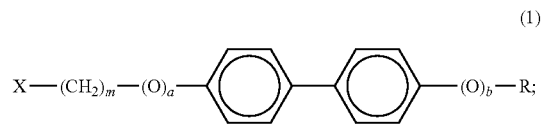

(1)

X represents acrylate, methacrylate, ethacrylate, vinyl, or allyl, m represents an integer of 0 to 12, a and b each independently represent 0 or 1, R represents C1-C20 alkyl, and hydrogen atoms in a ring structure may each independently be substituted with halogen atom, methyl, ethyl, or propyl;
the ratio of the molar concentration of the polyfunctional monomer in the liquid crystal composition to the molar concentration of the monofunctional monomer in the liquid crystal composition is not less than 1.5% and not more than 15%;

the ratio of the molar concentration of the polyfunctional monomer to the molar concentration of the monofunctional monomer is calculated as (mol % of the polyfunctional monomer in the liquid crystal composition)× 100/(mol % of the monofunctional monomer in the liquid crystal composition);

the total concentration of the polyfunctional monomer and the polymerization initiator relative to the monofunctional monomer is not more than 18 mol %;

the polyfunctional monomer is represented by Formula (2):

$$P^1-A^1-P^1 \quad (2);$$

$P^1$s each independently represent acrylate, methacrylate, ethacrylate, vinyl, or allyl, $A^1$ represents phenanthrylene, and hydrogen atoms in $A^1$ may each independently be substituted with halogen atom, methyl, ethyl, or propyl; and the polymerization initiator is represented by Formula (5):

(5)

wherein
- $R^1$ represents C1-C4 linear or branched alkyl or alkenyl, or $Sp^3$-$P^3$;
- $R^2$ represents C1-C4 linear or branched alkyl or alkenyl, or $Sp^4$-$P^4$;
- $P^1$, $P^2$, $P^3$, and $P^4$ represent radical polymerizable groups, a total number of $P^1$, $P^2$, $P^3$, and $P^4$ is at least two;
- $Sp^1$ and $Sp^2$ each represent C1-C6 linear, branched, or cyclic alkylene, alkyleneoxy, or carbonyloxy, or a direct bond;
- $Sp^3$ and $Sp^4$ each represent C1-C6 linear, branched, or cyclic alkylene, alkyleneoxy, or carbonyloxy;
- $L^1$ and $L^2$ each represent —F, —OH, or C1-C12 linear or branched alkyl, alkenyl, or aralkyl;
- $m^1$ represents an integer of 1 to 3;
- $m^2$ represents an integer of 0 to 3;
- $n^1$ and $n^2$ each represent an integer of 0 to 4; and
- a total of $m^1$ and $n^1$ is an integer of 1 to 5, a total of $m^2$ and $n^2$ is an integer of 0 to 5, and a total of $m^1$ and $m^2$ is an integer of 1 to 6.

2. The liquid crystal display device according to claim 1, wherein the liquid crystal molecules have negative dielectric anisotropy.

3. The liquid crystal display device according to claim 1, wherein the polyfunctional monomer in the liquid crystal composition has a higher mol concentration than the compound.

4. The liquid crystal display device according to claim 1, wherein the concentration of the polyfunctional monomer is 0.05 to 0.25% by weight of the liquid crystal composition.

5. The liquid crystal display device according to claim 1, wherein the concentration of the polymerization initiator is 0.005 to 0.3% by weight of the liquid crystal composition.

6. The liquid crystal display device according to claim 1, wherein the polymerization initiator is represented by Formula (6):

(6)

wherein
- $R^3$ and $R^4$ each represent C1-C4 linear or branched alkyl or alkenyl;
- $P^1$ and $P^2$ each represent radical polymerizable groups;
- $Sp^1$ and $Sp^2$ each represent C1-C6 linear, branched or cyclic alkylene, alkyleneoxy, or carbonyloxy, or a direct bond.

7. The liquid crystal display device according to claim 1, wherein the polymerization initiator is represented by Formula (7):

(7)

wherein
$R^5$ and $R^6$ each represent a hydrogen atom or methyl.

8. The liquid crystal display device according to claim 1, wherein, in Formula (1), m represents an integer of 1 to 8.

9. The liquid crystal display device according to claim 1, wherein, in Formula (1), m is zero.

* * * * *